(12) United States Patent
Kang et al.

(10) Patent No.: US 12,651,324 B2
(45) Date of Patent: Jun. 9, 2026

(54) IMAGE-BASED FINE DUST MEASUREMENT METHOD AND SYSTEM

(71) Applicant: DEEPVISIONS CO.,LTD., Seoul (KR)

(72) Inventors: Bong Su Kang, Seoul (KR); Jun Sang Cho, Seoul (KR); Won Hee Jo, Seoul (KR); Nalinh Thoummala, Seoul (KR); Sung Jae Lee, Seoul (KR); Hong Kyu Lee, Seoul (KR)

(73) Assignee: DEEPVISIONS CO., LTD., Seoul (KR)

( * ) Notice: Subject to any disclaimer, the term of this patent is extended or adjusted under 35 U.S.C. 154(b) by 281 days.

(21) Appl. No.: 18/395,985

(22) Filed: Dec. 26, 2023

(65) Prior Publication Data

US 2025/0209584 A1    Jun. 26, 2025

(30) Foreign Application Priority Data

Dec. 20, 2023    (KR) ......................... 10-2023-0187347

(51) Int. Cl.
*G06T 7/00*                (2017.01)

(52) U.S. Cl.
CPC .. *G06T 7/0002* (2013.01); *G06T 2207/10016* (2013.01); *G06T 2207/10024* (2013.01); *G06T 2207/20081* (2013.01); *G06T 2207/20084* (2013.01); *G06T 2207/30232* (2013.01)

(58) Field of Classification Search
CPC ....... G01N 15/0227; G01N 2015/0096; G06N 3/08; G06T 2207/10016; G06T 2207/10024; G06T 2207/20081; G06T 2207/20084; G06T 2207/30232; G06T 7/0002; G06T 7/10
See application file for complete search history.

(56) References Cited

U.S. PATENT DOCUMENTS

| | | | | |
|---|---|---|---|---|
| 2018/0336666 | A1* | 11/2018 | Kim | ........................... G06T 5/00 |
| 2021/0358092 | A1* | 11/2021 | Mironica | ................ G06T 7/337 |
| 2024/0029457 | A1* | 1/2024 | Kim | ..................... G06N 3/0464 |

FOREIGN PATENT DOCUMENTS

| | | | | |
|---|---|---|---|---|
| CN | 103985086 | A * | 8/2014 | |
| KR | 10-2018-0127782 | A | 11/2018 | |
| KR | 102326208 | B1 * | 11/2021 | ............. G06T 17/05 |

(Continued)

OTHER PUBLICATIONS

Won, T., Eo, Y. D., Sung, H., Chong, K. S., Youn, J., & Lee, G. W. (2022). Particulate Matter Estimation from Public Weather Data and Closed-Circuit Television Images. KSCE Journal of Civil Engineering, 26(2), 865-873. https://doi.org/10.1007/s12205-021-0865-4 (Year: 2022).*

*Primary Examiner* — Amandeep Saini
*Assistant Examiner* — Caroline Tabancay Duffy
(74) *Attorney, Agent, or Firm* — The PL Law Group, PLLC

(57) ABSTRACT

A fine dust measurement system includes a video photographing device that photographs a target place, generates a converted image or converted data by converting all or a portion of the photographed image and transmits the converted image or converted data, and a fine dust measurement that receives the converted image or converted data from the video photographing device, and trains a deep learning model to output a fine dust concentration of the target place by inputting the received converted image or converted data into the deep learning model.

8 Claims, 9 Drawing Sheets

100

102    150    104    104a

(56)            References Cited

FOREIGN PATENT DOCUMENTS

| KR | 20220057025 A | * | 5/2022 | ......... G01N 15/0227 |
| KR | 10-2022-0081832 A | | 6/2022 | |
| KR | 10-2023-0143832 A | | 10/2023 | |

* cited by examiner

100

102

FIRST CONVERTED IMAGE
(HS CHANNELS)

FIRST CONVERTED IMAGE
(S CHANNEL)

IMAGE OF REGION OF
INTEREST

SECOND CONVERTED
IMAGE

SECOND CONVERTED
IMAGE(TRANSMITTANCE)

THIRD CONVERTED
IMAGE

FOURTH CONVERTED
IMAGE

FIFTH CONVERTED
IMAGE

SIXTH CONVERTED
IMAGE

104

START

ACQUIRE PHOTOGRAPHED IMAGE OF TARGET PLACE — S201

EXTRACT REGION OF INTEREST — S203

ACQUIRE ENVIRONMENTAL INFORMATION/CLIMATE INFORMATION DURING PHOTOGRAPHING — S205

DETERMINE WHAT TYPE OF IMAGE TO CONVERT IMAGE OF REGION OF INTEREST — S207

GENERATE CONVERTED IMAGE — S209

OUTPUT FINE DUST CONCENTRATION BY INPUTTING CONVERTED IMAGE INTO DEEP LEARNING MODEL — S211

END

IMAGE-BASED FINE DUST MEASUREMENT METHOD AND SYSTEM

CROSS-REFERENCE TO RELATED APPLICATION AND CLAIM OF PRIORITY

This application claims the benefit under 35 USC § 119 of Korean Patent Application No. 10-2023-0187347, filed on Dec. 20, 2023, in the Korean Intellectual Property Office, the entire disclosure of which is incorporated herein by reference for all purposes.

BACKGROUND

1. Field

Embodiments of the present disclosure relate to a fine dust measurement technology.

2. Description of Related Art

Fine dust is dust whose particles are so small that they are invisible to the eye. There are studies showing that fine dust incapacitates a defense system of the body and has various effects on the body, such as cardiovascular, respiratory, and cerebrovascular diseases, and the International Agency for Research on Cancer (IARC) under the World Health Organization (WHO) announced that fine dust was designated as a group 1 carcinogen. Due to these risks, fine dust is being analyzed as the cause of the problem of declining economic activity among members of society.

Meanwhile, CCTV cameras are installed throughout a region, such as buildings or roads, for the purposes of crime prevention, security, vehicle surveillance, etc. Therefore, it is possible to check the situation in each region in real time through CCTV video images. However, CCTV video images are not being used to measure the concentration of fine dust. Since changes due to climate environment are recognized as greater than changes due to fine dust in the RGB video images photographed by CCTV cameras, it is not easy to accurately measure the effects of fine dust.

SUMMARY

Embodiments of the present disclosure are intended to provide a fine dust measurement method and system using a new technique.

According to an exemplary embodiment of the present disclosure, there is provided a fine dust measurement system including a video photographing device that photographs a target place, generates a converted image or converted data by converting all or a portion of the photographed image and transmits the converted image or converted data, and a fine dust measurement that receives the converted image or converted data from the video photographing device, and trains a deep learning model to output a fine dust concentration of the target place by inputting the received converted image or converted data into the deep learning model.

The video photographing device may generate a converted image by performing a first type of conversion for converting all or a portion of the photographed image into an image with different characteristics, or generate converted data by performing a second type of conversion for converting all or a portion of the photographed image into data in another form.

The video photographing device may determine which type of conversion to perform among the first type of conversion and the second type of conversion depending on a degree of network communication between the video photographing device and the fine dust measurement device.

The video photographing device may determine to perform the first type of conversion when the degree of network communication is equal to or greater than a preset first reference level and determine to perform the second type of conversion when the degree of network communication is less than a second reference level set to be lower than the first reference level.

The video photographing device may generate a plurality of converted images of different types according to preset conversion methods, respectively, during the first type of conversion and transmits the plurality of converted images of different types to the fine dust measurement device, and the fine dust measurement device may input the plurality of converted images into the deep learning model, respectively, to train the deep learning model so that prediction values of fine dust concentration for the plurality of converted images are output, respectively, and a difference between each of the prediction values of fine dust concentration and a correct answer value is minimized.

The fine dust measurement device may extract a prediction value which is closest to the correct answer value among the prediction values of fine dust concentration, store a type of converted image corresponding to the extracted prediction value by matching the type with one or more of environmental information and climate information during photographing, and share the matched and stored information with the video photographing device.

The video photographing device may acquire one or more of the environmental information and climate information during photographing of the target place, determine what type of image to convert all or a portion of the photographed image based on one or more of the acquired environmental information and climate information, generate a converted image by converting all or a portion of the photographed image into an image of the determined type, and transmit the converted image to the fine dust measurement device.

The fine dust measurement device may output the fine dust concentration of the target place by inputting the converted image into a previously trained deep learning model.

According to an exemplary embodiment of the present disclosure, there is provided a fine dust measurement method performed on a computing device including one or more processors and a memory that stores one or more programs executed by the one or more processors, the method including photographing a target place, generating a converted image or converted data by converting all or a portion of a photographed image, and transmitting the converted image or the converted data to a fine dust measurement device equipped with a deep learning model, in which the fine dust measurement device trains a deep learning model to output a fine dust concentration of the target place by inputting the converted image or converted data into the deep learning model.

In the generating, a converted image is generated by performing a first type of conversion for converting all or a portion of the photographed image into an image with different characteristics, or converted data is generated by performing a second type of conversion for converting all or a portion of the photographed image into data in another form.

The generating may include determining to perform the first type of conversion when a degree of network communication with the fine dust measurement device is equal to or greater than a preset first reference level and determining to perform the second type of conversion when the degree of network communication is less than a second reference level set to be lower than the first reference level.

The fine dust measurement method may further include acquiring one or more of the environmental information and climate information during photographing of the target place, and determining what type of image to convert all or a portion of the photographed image based on one or more of the acquired environmental information and climate information during the first type of conversion.

According to an exemplary embodiment of the present disclosure, there is provided a fine dust measurement method performed on a computing device including one or more processors and a memory that stores one or more programs executed by the one or more processors, the method including acquiring a photographed image of a target place, generating a converted image by converting all or a portion of the photographed image, and training a deep learning model to output a fine dust concentration of the target place by inputting the converted image into the deep learning model.

In the generating of the converted image, a plurality of converted images of different types may be respectively generated according to preset conversion methods, and, in the training, the plurality of converted images may be input into the deep learning model, respectively, to train the deep learning model so that prediction values of fine dust concentration for the plurality of converted images are output, respectively, and a difference between each of the prediction values of fine dust concentration and a correct answer value is minimized.

The fine dust measurement method may further include extracting a prediction value which is closest to the correct answer value among the prediction values of fine dust concentration, and storing a type of converted image corresponding to the extracted prediction value by matching the type with one or more of environmental information and climate information during photographing of the photographed image.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In addition, terms such as first, second, etc. may be used to describe various components, but the components should not be limited by the terms. Terms may be used for the purpose of distinguishing one component from another. For example, a first component may be referred to as a second component, and similarly, the second component may also be referred to as a first component without departing from the scope of the present disclosure.

Figure 1:
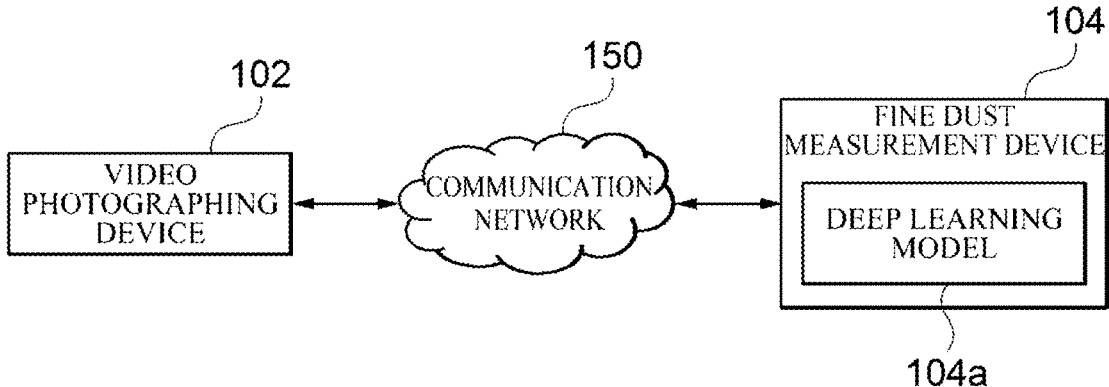
FIG. 1 is a diagram illustrating a configuration of an image-based fine dust measurement system according to an embodiment of the present disclosure.

FIG. 1 is a diagram illustrating a configuration of an image-based fine dust measurement system according to an embodiment of the present disclosure.

Referring to FIG. 1, a fine dust measurement system 100 may include a video photographing device 102 and a fine dust measurement device 104. The video photographing device 102 may be communicatively connected to the fine dust measurement device 104 through a communication network 150.

Here, the communication network 150 may include the Internet, one or more local area networks, wide area networks, cellular networks, mobile networks, other types of networks, or a combination of these networks.

The video photographing device 102 may photograph a place (target place) where the concentration of fine dust is to be measured. The video photographing device 102 may be fixedly installed at a place where the concentration of fine dust is to be measured. For example, the video photographing device 102 may be fixedly installed in a building or on a road, like a CCTV camera.

However, the present disclosure is not limited thereto, and the video photographing device 102 may be provided to be movable through a separate moving means. For example, the video photographing device 102 may be provided to photograph a place where the concentration of fine dust is to be measured while moving by being mounted on a vehicle.

In addition, the video photographing device 102 may be a mobile device that people carry around and equipped with a camera (e.g., a smart phone, tablet PC, smart glasses, wearable device, etc.), and may include other electronic devices capable of photographing a video image.

Figure 2:
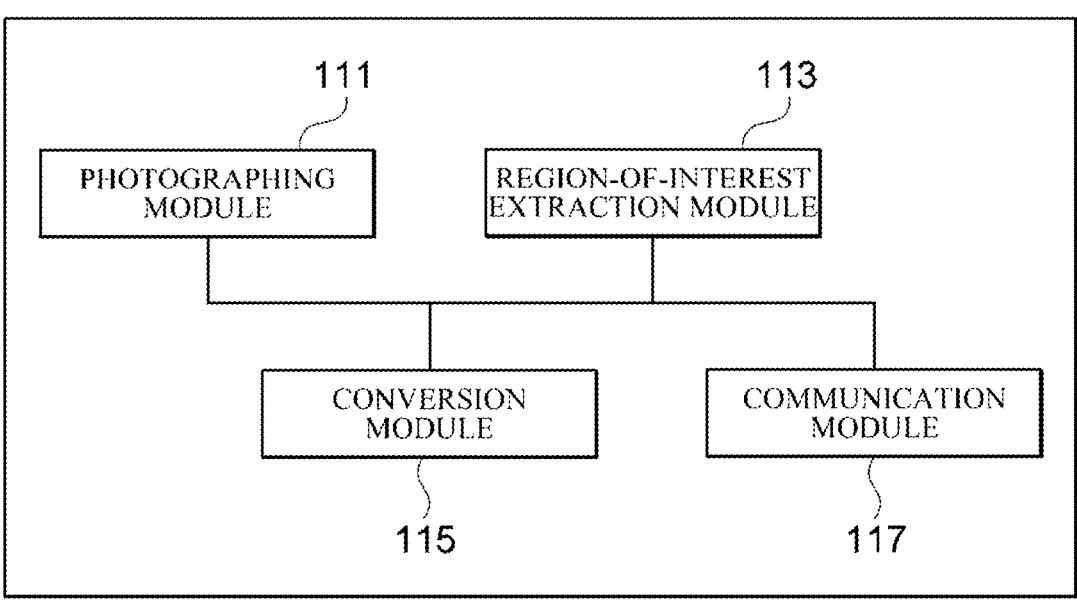
FIG. 2 is a block diagram illustrating the configuration of a video photographing device according to an embodiment of the present disclosure.

FIG. 2 is a block diagram illustrating a configuration of the video photographing device 102 according to an embodiment of the present disclosure. Referring to FIG. 2, the video photographing device 102 may include a photographing module 111, a region-of-interest extraction module 113, a conversion module 115, and a communication module 117.

The photographing module 111 may include a camera. The photographing module 111 may photograph a place where the concentration of fine dust is to be measured using the camera. In one embodiment, the image photographed by the photographing module 111 may be a red, green, blue (RGB) image.

The region-of-interest extraction module 113 may extract the region of interest from the photographed image. The region-of-interest extraction module 113 may extract a border area of each object included in the photographed image, and when a change in pixel value within the border area exceeds a preset threshold value, a region containing the corresponding object can be extracted as the region of interest. Since the technology for extracting the border area of the object within an image is already a known technology, a detailed description thereof will be omitted.

Figure 3:
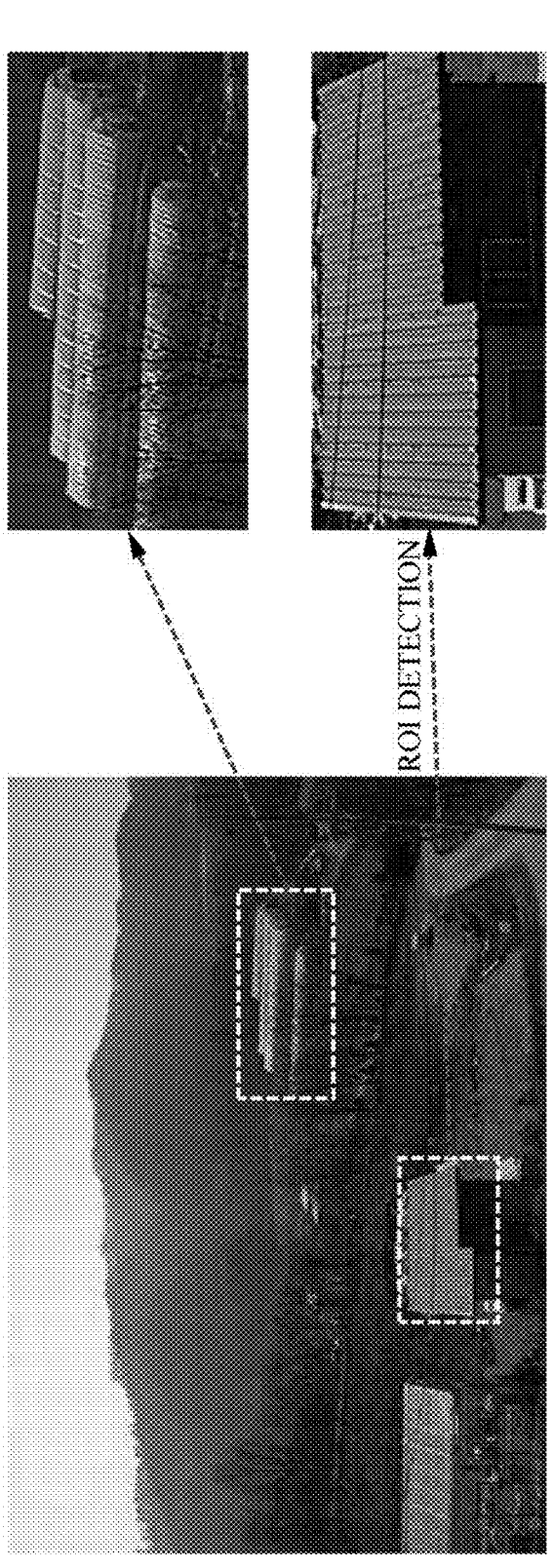
FIG. 3 is a diagram illustrating a state of extracting a region of interest from an image according to an embodiment of the present disclosure.

FIG. 3 is a diagram illustrating a state of extracting the region of interest from an image according to an embodiment of the present disclosure. Referring to FIG. 3, the region-of-interest extraction module 113 may extract the border area of each object included in the photographed image, that is, a mountain, vinyl greenhouses, trees, and a temporary building.

Here, pixels are generally displayed darkly within the border area between the mountain and the trees, and thus changes in pixel values are small. On the other hand, the pixels within the border area of the vinyl greenhouses are brighter than the surrounding background, and the pixel value changes significantly due to the internal steel frame that is revealed at regular intervals. In addition, pixels within the border area of the temporary building (in FIG. 2, a building with a green roof) show significant changes in pixel values due to the uneven color and curvature of the roof. Accordingly, the region-of-interest extraction module 113 may extract portions of the temporary building and the vinyl greenhouse from the photographed images as regions of interest (ROI), respectively.

The conversion module 115 may perform conversion on the image of the region of interest in order to use the image of the region of interest as an input to a deep learning model 104a. That is, the conversion module 115 may convert the image of the region of interest (i.e., RGB image) into an image with different characteristics (first type of conversion) or into another form of data (second type of conversion). The conversion module 115 may determine which type of conversion to perform among the first type of conversion and the second type of conversion on the image of the region of interest depending on a network communication environment between the video photographing device 102 and the fine dust measurement device 104, In one embodiment, the conversion module 115 may perform the first type of conversion on the image of the region of interest when a degree of network communication between the video photographing device 102 and the fine dust measurement device 104 is equal to or greater than a preset first reference level. That is, when the degree of network communication is equal to or greater than the preset first reference level, the conversion module 115 may convert the image of the region of interest into an image with other characteristics. Here, the degree of network communication may be calculated based on one or more of network communication delay, network bandwidth, and network communication speed between the video photographing device 102 and the fine dust measurement device 104.

Specifically, the conversion module 115 may convert the image of the region of interest into one or more images having characteristics sensitive to fine dust. That is, the conversion module 115 may convert the image of the region of interest into one or more images suitable for measuring the concentration of fine dust.

In one embodiment, the conversion module 115 may generate a first converted image by converting the red, green, blue (RGB) image of the region of interest into a hue, saturation, value (HSV) image. Here, because the HSV image has pure color information in hue (H), colors can be classified more easily in HSV image than in RGB image, and are less affected by changes in illuminance or shade by adjusting the value (V) value.

When the image of the region of interest is converted to the HSV image, the conversion module 115 may use the HSV image itself as the first conversion image, use hue (H) and saturation (S) channels in the HSV image as the first conversion image, or use only the saturation (S)channel in the HSV image as the first conversion image. In this case, the hue (H) or saturation (S) value varies depending on the concentration of fine dust.

In addition, the conversion module 115 may generate a second converted image by performing image conversion on the RGB image of the region of interest by applying the dark channel prior (DCP) technique to the RGB image of the region of interest. When the dark channel prior (DCP) technique is applied to the RGB image of the region of interest, haze (a phenomenon in which the object appears hazy due to the propagation of light being interrupted by substances present between the object and the camera) present in the RGB image of the region of interest can be removed. In this case, the image conversion module 106 may extract the transmittance characteristics of the RGB image of the region of interest based on the dark channel prior (DCP) technique and use this as the second converted image. The turbidity of the second converted image varies depending on the concentration of fine dust.

In addition, the conversion module 115 may generate a third conversion image by performing image conversion on the RGB image of the region of interest by applying a Gabor Filter to the RGB image of the region of interest. When the Gabor filter is applied to the RGB image of the region of interest, an edge can be extracted from the region of interest, and the clarity of the edge varies depending on the amount of fine dust.

In addition, the conversion module 115 may generate a fourth conversion image by performing image conversion on the RGB image of the region of interest by applying a Sobel Filter to the RGB image of the region of interest. The Sobel filter is a filter that performs filtering according to the direction of frequency in an image, and can detect a diagonal edge more sensitively than the horizontal and vertical edges.

In addition, the conversion module 115 may generate a fifth conversion image by performing image conversion on the RGB image of the region of interest by applying the local binary pattern (LBP) technique to the RGB image of the region of interest. The local binary pattern (LBP) technique extracts features of an image by converting pixel values around each pixel of the image into binary numbers (0 or 1). The binary numbers are generated according to a relative brightness difference between the center pixel and neighboring pixels. That is, if the neighboring pixel is larger than the center pixel, it is treated as a binary number, 1, and if it is smaller than the center pixel, it is treated as a binary number of 0.

In addition, the conversion module 115 may generate the sixth converted image by performing image conversion on the RGB image of the region of interest by applying Laplacian Filter to the RGB image of the region of interest. The Laplacian filter performs second differentiation in the horizontal and vertical directions of the image, and through this, it is possible to find the center of the edge portion (i.e., the inflection point of pixel value change).

Figure 4:
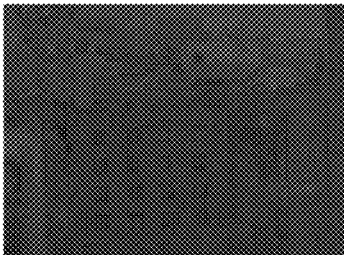
FIG. 4 is a diagram illustrating first to sixth converted images generated by performing a first type of conversion on an image of the region of interest in an embodiment of the present disclosure.
Figure 4:
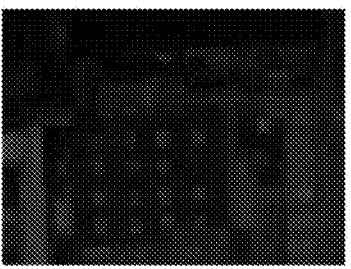
Figure 4:
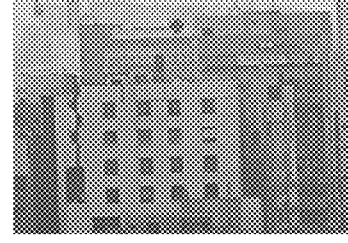
Figure 4:
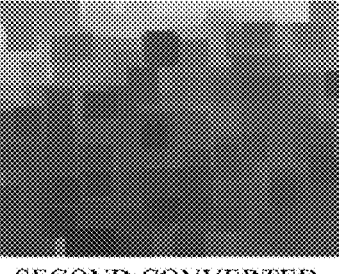
Figure 4:
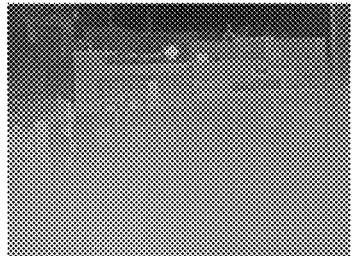
Figure 4:
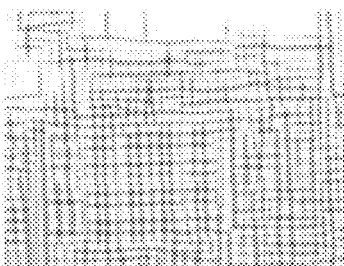
Figure 4:
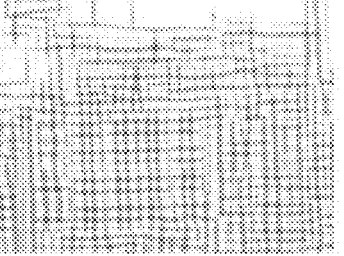
Figure 4:
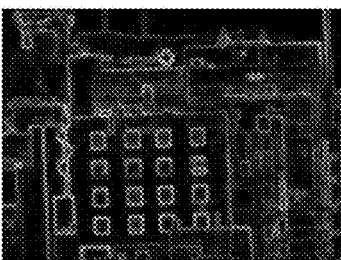
Figure 4:
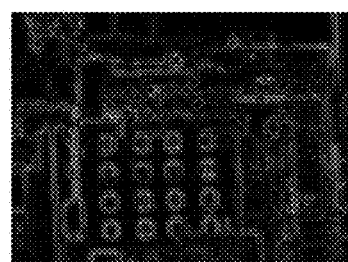

FIG. 4 is a diagram illustrating first to sixth converted images generated by performing the first type of conversion on the image of the region of interest in an embodiment of the present disclosure. The conversion module 115 may generate first to sixth conversion images, respectively, based on the image of the region of interest in a training phase of the deep learning model 104*a*.

Meanwhile, the conversion module 115 may determine which type of image conversion to perform when performing the first type of conversion on the image of the region of interest based on additional information input at an inference phase for measuring the concentration of fine dust after training of the deep learning model 104*a* is completed, which will be described later. Here, the additional information may be environmental information or climate information of the place for measuring the concentration of fine dust. In one embodiment, the additional information may include, but is not limited to, the temperature, humidity, illuminance, and wind speed of the place for measuring the concentration of fine dust.

The conversion module 115 may perform the second type of conversion on the image of the region of interest when the degree of network communication between the video photographing device 102 and the fine dust measurement device 104 is less than a preset second reference level. Here, the second reference level is a lower level than the first reference level.

The conversion module 115 may convert the image of the region of interest into a data value through the second type of conversion. In one embodiment, the conversion module 115 may calculate the root mean square (RMS) Contrast for the image of the region of interest and use it as first conversion data. The root mean square (RMS) Contrast can be defined as the standard deviation of image pixel intensity. The RMS Contrast can be expressed as Equation 1.

$$RMS = \sqrt{\frac{1}{M}\sum_{i=1}^{N}\sum_{j=1}^{M}(I_{ij} - avg(I))^2} \qquad \text{(Equation 1)}$$

$I_{ij}$: Intensity of pixel (i,j) of M×N sized image
avg(I): Average intensity of all pixels in image In addition, the conversion module 115 may calculate entropy for the image of the region of interest and use it as second converted data. Here, entropy quantifies information contained in the image and is related to an image texture, and can be calculated through Equation 2 below.

$$entropy = -\sum_{i=1}^{M} p_i \log_2 p_i \qquad \text{(Equation 2)}$$

$p_i$: Probability that pixel intensity is equal to i
M: Maximum intensity of image Here, since the RMS Contrast or entropy is a single numeric value, converted data for the image of the region of interest can be transmitted without difficulty even when the degree of network communication between the video photographing device 102 and the fine dust measurement device 104 is equal to or less than the preset second reference level.

Meanwhile, here, the conversion module 115 is described as performing the first type of conversion or the second type of conversion on the image of the region of interest, but is not limited thereto, and may perform the first type of conversion or the second type of conversion on the photographed image.

The communication module 117 may communicate with the fine dust measurement device 104. The communication module 117 may measure the degree of network communication between the video photographing device 102 and the fine dust measurement device 104. In addition, the communication module 117 may transmit the converted image or converted data for the image of the region of interest generated by the conversion module 115 to the fine dust measurement device 104.

The fine dust measurement device 104 may receive the converted image or converted data from the video photographing device 102 and measure the fine dust concentration of the corresponding place based on this. Here, the converted image or converted data may be about the photographed image or a region of interest in the photographed image. The fine dust measurement device 104 may measure fine dust concentration based on the deep learning technology. Accordingly, the fine dust measurement device 104 may include the deep learning model 104*a*.

The deep learning model 104*a* may receive the converted image or converted data as input and may be trained to predict the fine dust concentration of the corresponding place based on the received converted image or converted data. The deep learning model 104*a* may be trained so that the difference between the predicted fine dust concentration and the actually measured fine dust concentration (i.e., correct answer value) is minimized.

Here, the correct answer value may be acquired from a device that actually measures the concentration of fine dust (e.g., light scattering sensor, etc.) in the target place (place where fine dust is to be measured). The fine dust concentration measurement device may actually measure the fine dust concentration of the target place according to the time period when the target place is photographed. However, the present disclosure is not limited thereto, and, as the correct answer, fine dust concentration data for the region including the target place may be received from an external organization.

Figure 5:
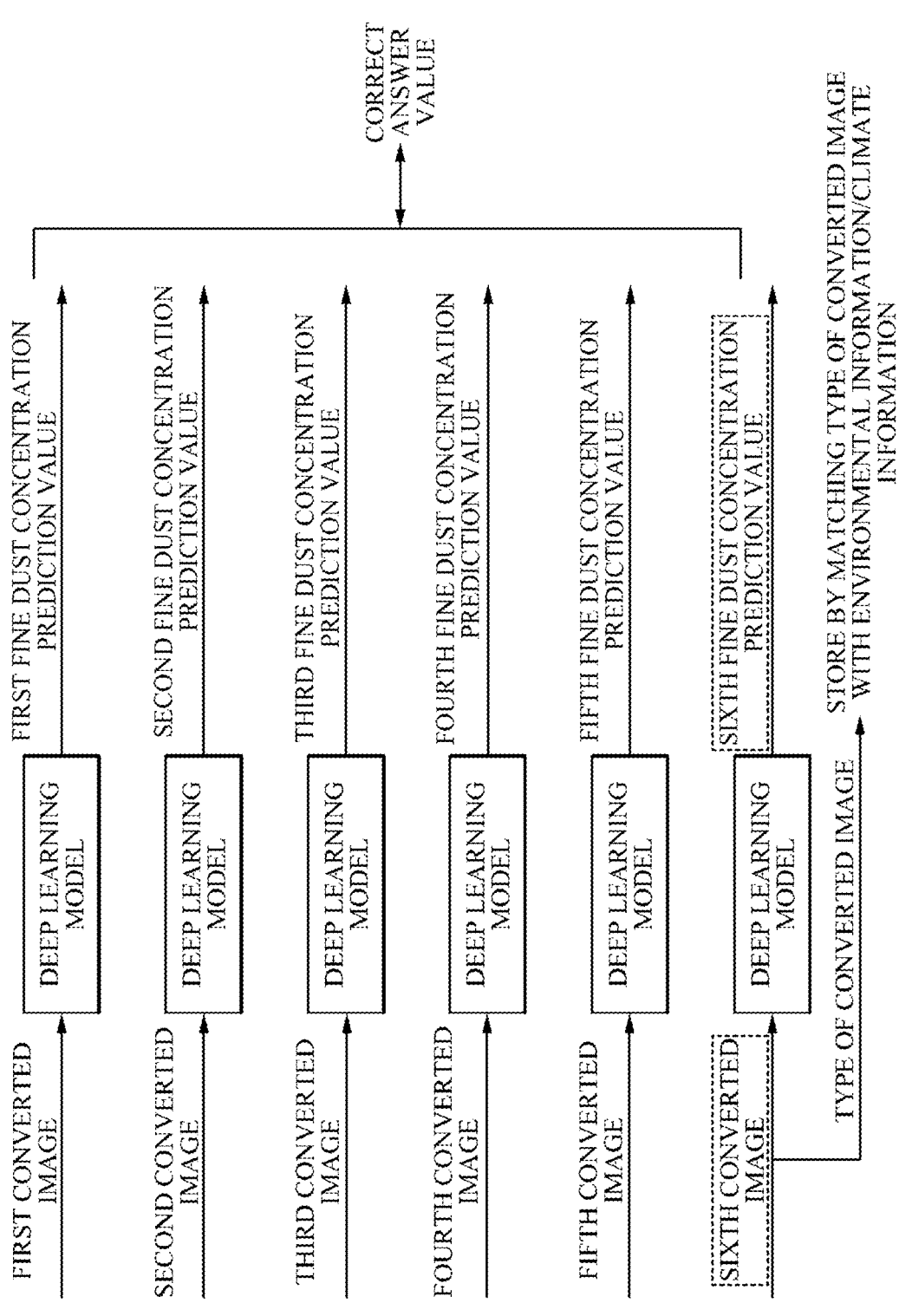
FIG. 5 is a diagram schematically illustrating a method of training a deep learning model in an embodiment of the present disclosure.

When the converted image is received from the video photographing device 102, a method of training the deep learning model 104*a* will be described with reference to FIG. 5. FIG. 5 is a diagram schematically illustrating the method of training the deep learning model 104*a* in an embodiment of the present disclosure.

Referring to FIG. 5, the fine dust measurement device 104 may receive the first to sixth converted images for the photographed image (or the image of region of interest) from the video photographing device 102, respectively.

The fine dust measurement device 104 may input the first to sixth converted images into the deep learning model 104*a*, respectively. The first to sixth converted images are not input simultaneously but may be input sequentially for each training epoch. In one embodiment, the deep learning model 104*a* may be an image-based classification model. For example, the deep learning model 104*a* may be ResNet 50, but is not limited thereto, and of course, various other deep learning models may be used.

The deep learning model 104*a* may receive the first converted image as input and output a first fine dust concentration prediction value. The deep learning model 104*a* may receive the second converted image as input and output a second fine dust concentration prediction value. Likewise, the deep learning model 104*a* may receive third to sixth converted images as input and output third to sixth fine dust concentration prediction values, respectively. The deep learning model 104*a* may be trained so that the difference between each of the first to sixth fine dust concentration prediction values and the correct answer value (actually measured fine dust concentration value) is minimized by comparing each of the first to sixth fine dust concentration prediction values with the correct answer value.

In one embodiment, during the training process, the fine dust measurement device 104 may extract the prediction value closest to the correct answer value among the first to sixth fine dust concentration prediction values, and store the type of converted image corresponding to the extracted prediction value by matching the type of converted image with one or more of environmental information and climate information (e.g., illuminance of the target place, etc.) and climate information (e.g., temperature, humidity, and wind speed of the target place, etc.) during photographing of the corresponding image.

For example, when the sixth fine dust concentration prediction value is closest to the correct answer value, the fine dust measurement device 104 may store the type of converted image corresponding to the sixth fine dust concentration prediction value by matching the type of converted image with environmental information and climate information during photographing of the image. Through this, it is possible to establish a criterion for converting the photographed image from environmental and climate information into what type of image (i.e., which image among the first to the sixth conversion images). The fine dust measurement device 104 may share the matched information with the video photographing device 102.

The fine dust measurement device 104, during training of the deep learning model 104*a*, may receive converted images of images photographed in various places and time periods, and train the deep learning model 104*a* using the received converted images as training data.

In addition, the fine dust measurement device 104 may train the deep learning model 104*a* by receiving converted data (for example, RMS Contrast value or entropy value for the photographed image (or region of interest image), etc.) from the video photographing device 102. The deep learning model 104*a* may output the fine dust concentration prediction value using the converted data as input. The deep learning model 104*a* may be trained so that the difference between the fine dust concentration prediction value) and the correct answer value is minimized.

Meanwhile, here, it has been described as an example that there is only one deep learning model 104*a*, but is not limited thereto, and a deep learning model may be prepared for each converted image or converted data. For example, a corresponding deep learning model may be provided for each converted image or converted data, such as a first deep learning model that outputs the first fine dust concentration prediction value using the first converted image as input and, a second deep learning model that outputs a second fine dust concentration prediction value using the second converted image as input, etc.

According to embodiments of the present disclosure, by converting the image photographed by the video photographing device into the converted image with characteristics sensitive to fine dust or converted data and then inputting the converted image or converted data into the deep learning model to output the fine dust concentration at the target place, it is possible to easily measure the concentration of fine dust in a specific place without expensive fine dust measuring equipment.

In addition, since the fine dust concentration can be measured only with the photographed image of the target place, the fine dust concentration can be easily checked using CCTV cameras installed throughout the region. In addition, if users want to know the fine dust concentration in a specific place while moving, the users just needs to be provided with an image obtained by photographing that place.

In this specification, a module may mean a functional and structural combination of hardware for carrying out the technical idea of the present disclosure and software for driving the hardware. For example, the "module" may mean a logical unit of a predetermined code and hardware resources for executing the predetermined code, and does not necessarily mean a physically connected code or one type of hardware.

Figure 6:
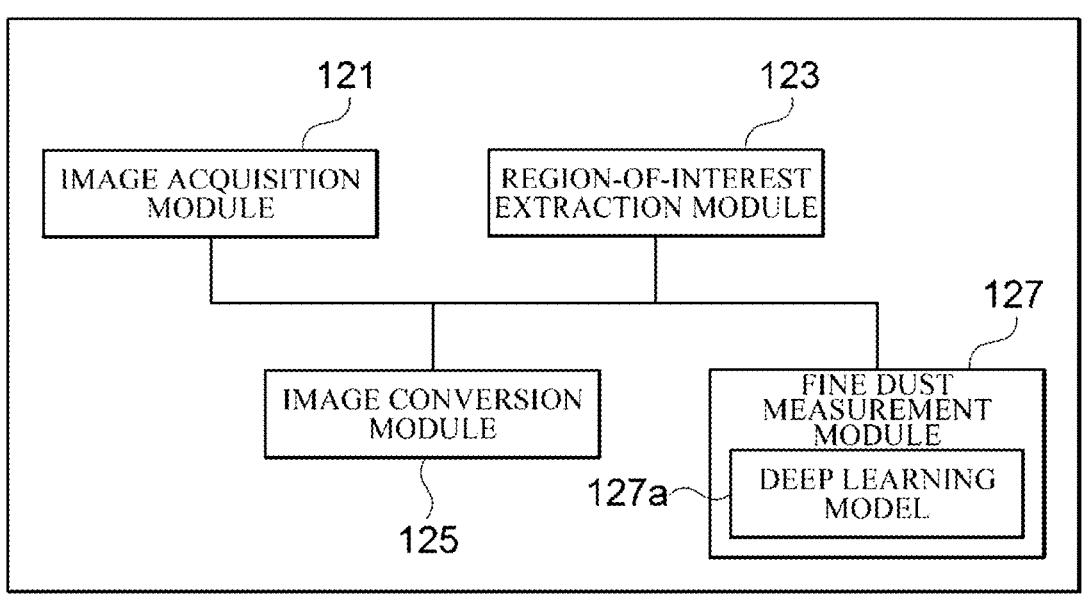
FIG. 6 is a block diagram illustrating a configuration of a fine dust measurement device according to another embodiment of the present disclosure.

In addition, in FIGS. 1 and 2, it has been described that the video photographing device 102 extracts the region of interest from the photographed image and converts the image of the region of interest into an image with other characteristics, but is not limited thereto. Such a process may also be performed in the fine dust measurement device 104. FIG. 6 is a block diagram illustrating the configuration of the fine dust measurement device 104 according to another embodiment of the present disclosure.

Referring to FIG. 6, the fine dust measurement device 104 may include an image acquisition module 121, a region-of-interest extraction module 123, an image conversion module 125, and a fine dust measurement module 127.

The image acquisition module 121 may acquire an image of a place where the concentration of fine dust is to be measured. In one embodiment, the image acquisition module 121 may acquire an image from a video photographing device. The video photographing device may be a CCTV camera installed in a building or road for the purpose of crime prevention, security, vehicle surveillance, etc., or a mobile device equipped with a camera, but is not limited thereto.

The region-of-interest extraction module 123 may extract the region of interest from the acquired image. The region-of-interest extraction module 123 may extract a border area of each object included in the acquired image, and when a change in pixel value within the border area exceeds a preset threshold value, a region containing the corresponding object may be extracted as the region of interest. Since the region-of-interest extraction module 123 is the same or similar to the region-of-interest extraction module 113 of FIG. 2, detailed description thereof will be omitted.

The image conversion module 125 may convert the image of the region of interest (i.e., RGB image) into an image with other characteristics. The image conversion module 125 may convert the image of the region of interest into one or more images having characteristics sensitive to fine dust. For example, the image conversion module 125 may generate one or more of the first to sixth conversion images through image conversion for the image of the region of interest.

Meanwhile, the conversion module 115 may determine which type of image conversion to perform when performing the first type of conversion on the image of the region of interest based on additional information (such as environmental or climate information) input at the inference phase for measuring the concentration of fine dust after training of a deep learning model 127a is completed.

The fine dust measurement module 127 may receive the converted image from the image conversion module 125 and measure the fine dust concentration of the place where the image was photographed based on the received converted image. The fine dust measurement module 127 may include the deep learning model 127a. The deep learning model 127a may receive the converted image as input and may be trained to predict the fine dust concentration of the corresponding place based on the received converted image. Since the deep learning model 127a is the same or similar to the deep learning model 104a of FIG. 1, detailed description thereof will be omitted.

Figure 7:
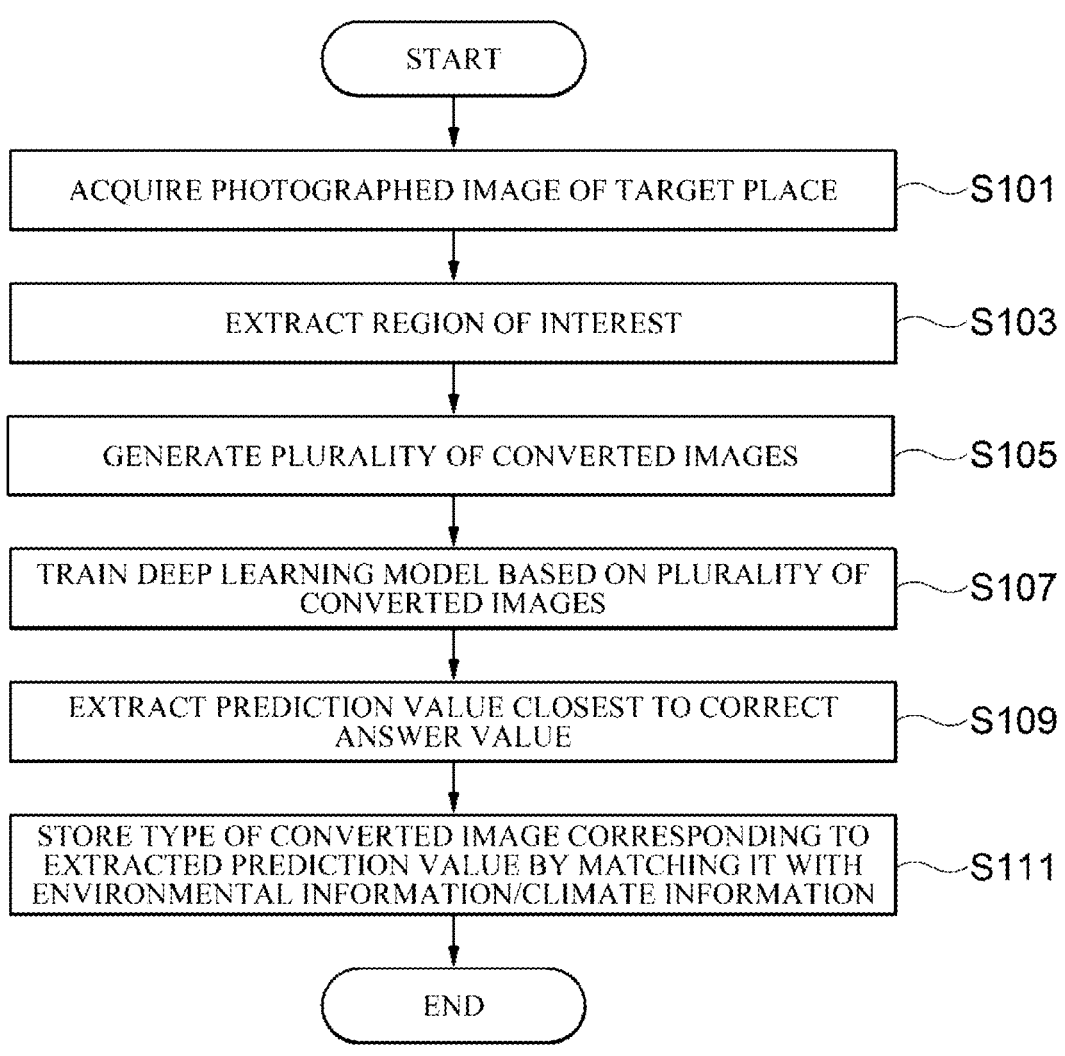
FIG. 7 is a flowchart for describing a process of training the deep learning model in an embodiment of the present disclosure.

FIG. 7 is a flowchart for describing a process of training the deep learning model in an embodiment of the present disclosure. In the illustrated flowchart, the method is described by being divided into a plurality of steps, but at least some of the steps may be performed in a different order, may be performed together in combination with other steps, omitted, may be performed by being divided into detailed steps, or may be performed by being added with one or more steps (not illustrated).

Referring to FIG. 7, the fine dust measurement device 104 may acquire an image of a place where the concentration of fine dust is to be measured (S 101). Next, the fine dust measurement device 104 may extract the region of interest from the acquired image (S 103).

Next, the fine dust measurement device 104 may generate a plurality of converted images by performing image conversion on the image of the region of interest according to preset conversion methods (S 105). In one embodiment, the fine dust measurement device 104 may perform image conversion on the image of the region of interest to generate the first to sixth converted images, respectively.

Next, the fine dust measurement device 104 may input a plurality of converted images into the deep learning model 104a, respectively, to train the deep learning model 104a (S 107). Here, the deep learning model 104a may be trained so that the fine dust concentration prediction value is output for each of the plurality of converted images and the difference between the output predicted fine dust concentration value and the correct answer value is minimized.

Next, the fine dust measurement device 104 may extract the prediction value, which is closest to the correct answer value, among the fine dust concentration prediction values for the plurality of converted images (S 109), and store the type of converted image corresponding to the extracted prediction value by matching the type of converted image with one or more of environmental information and climate information during photographing of the acquired image (S 111).

Figure 8:
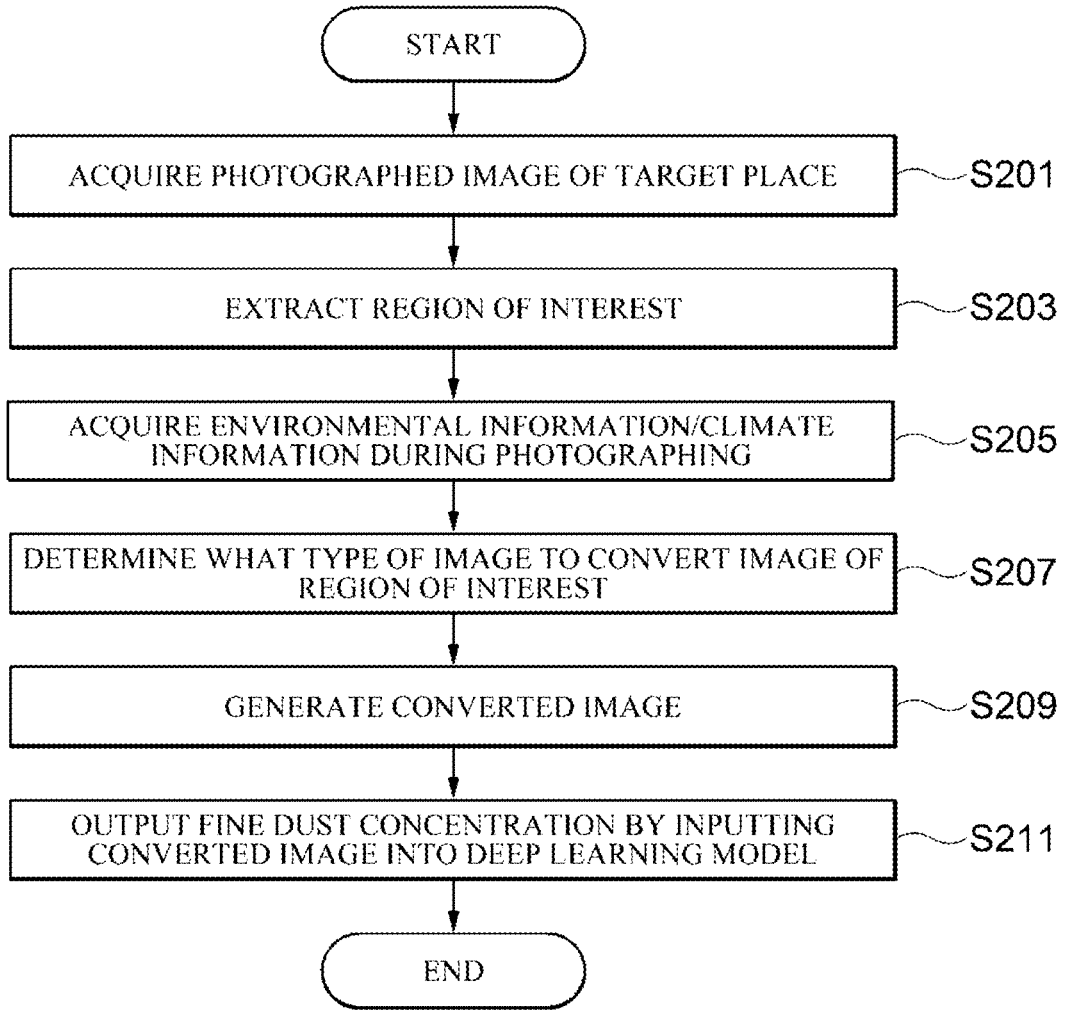
FIG. 8 is a flow chart for describing a process of performing inference with the deep learning model in an embodiment of the present disclosure.

FIG. 8 is a flow chart for describing a process of performing inference with the deep learning model in an embodiment of the present disclosure. In the illustrated flowchart, the method is described by being divided into a plurality of steps, but at least some of the steps may be performed in a different order, may be performed together in combination with other steps, omitted, may be performed by being divided into detailed steps, or may be performed by being added with one or more steps (not illustrated).

Referring to FIG. 8, the fine dust measurement device 104 may acquire the image of the place where the concentration of fine dust is to be measured (target place) (S 201). Next, the fine dust measurement device 104 may extract the region of interest from the acquired image (S 203).

Next, the fine dust measurement device 104 may acquire one or more of environmental information and climate information during photographing of the acquired image (S 205). Next, the fine dust measurement device 104 may determine what type of image to convert the image of the region of interest into based on one or more of environmental information and climate information (S 207).

Next, the fine dust measurement device 104 may generate a converted image by converting the image of the region of interest into a predetermined type of image (S 209). Next, the fine dust measurement device 104 may output the fine dust concentration of the target place by inputting the converted image into the previously trained deep learning model 104a (S 211).

Meanwhile, here, it has been described as determining what type of image to convert the image of the region of interest into based on one or more of environmental information and climate information and generating the determined type of converted image, but is not limited thereto. The fine dust concentration of the target place may also be calculated by converting the image of the region of interest according to a preset conversion method to generate all of the first to sixth converted images, inputting first to sixth converted images into the previously trained deep learning model to output the fine dust concentrations, respectively, and averaging the output fine dust concentration values.

Figure 9:
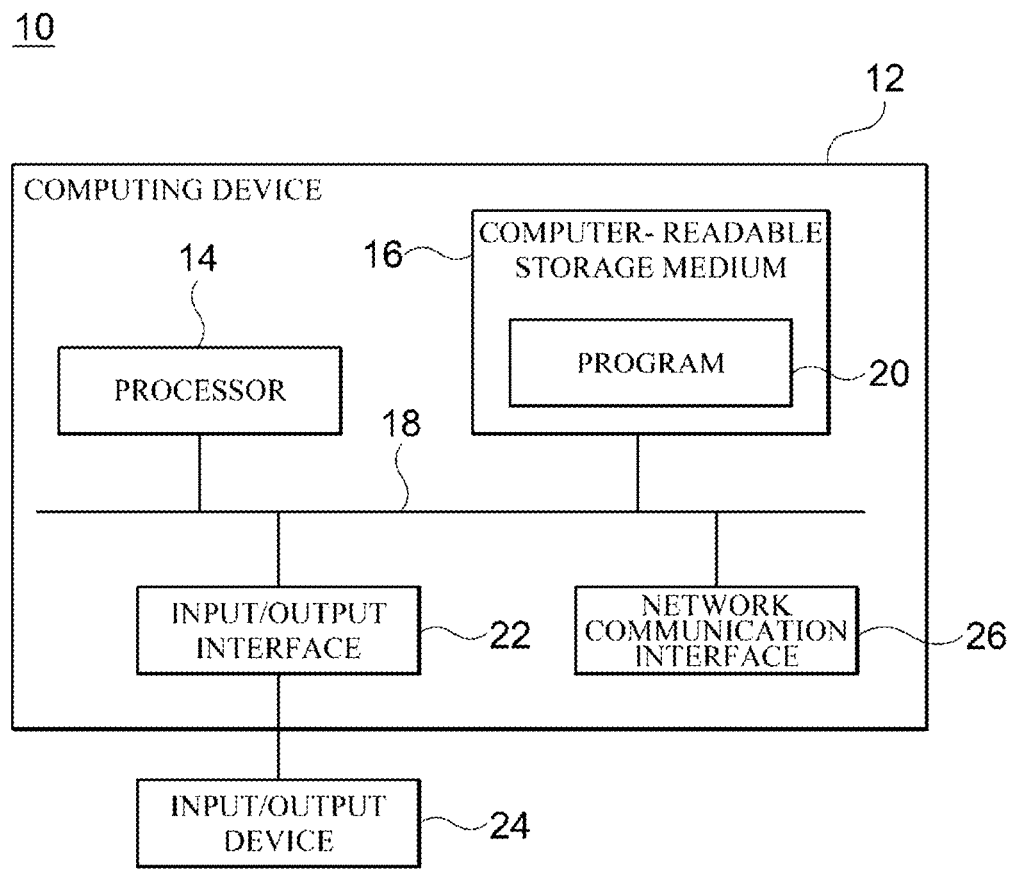
FIG. 9 is a block diagram for illustratively describing a computing environment including computing devices suitable for use in exemplary embodiments.

FIG. 9 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In one embodiment, the computing device 12 may be the video photographing device 120. In addition, the computing device 12 may be the fine dust measurement device 104.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, nonvolatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

According to embodiments of the present disclosure, by converting the image photographed by the video photographing device into the converted image with characteristics sensitive to fine dust or converted data and then inputting the converted image or converted data into the deep learning model to output the fine dust concentration at the target place, it is possible to easily measure the concentration of fine dust in a specific place without expensive fine dust measuring equipment.

In addition, since the fine dust concentration can be measured only with the photographed image of the target place, the fine dust concentration can be easily checked using CCTV cameras installed throughout the region. In addition, if users want to know the fine dust concentration in a specific place while moving, the users just needs to be provided with an image obtained by photographing that place.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A fine dust measurement system comprising:
a video photographing device configured to photograph a target place, generate a converted image or converted data by converting all or a portion of the photographed image and transmit the converted image or converted data; and
a fine dust measurement device configured to receive the converted image or converted data from the video photographing device, and train a deep learning model to output a fine dust concentration of the target place by inputting the received converted image or converted data into the deep learning model, wherein the video photographing device is configured to generate a converted image by performing a first type of conversion for converting all or a portion of the photographed image into an image with different characteristics, or generate converted data by performing a second type of conversion for converting all or a portion of the photographed image into data in another form,
wherein the video photographing device is configured to determine which type of conversion to perform among the first type of conversion and the second type of conversion depending on a degree of network communication between the video photographing device and the fine dust measurement device.

2. The fine dust measurement system of claim 1, wherein the video photographing device is configured to determine to perform the first type of conversion when the degree of network communication is equal to or greater than a preset first reference level and determine to perform the second type of conversion when the degree of network communication is less than a second reference level set to be lower than the first reference level.

3. The fine dust measurement system of claim 1, wherein the video photographing device is configured to generate a plurality of converted images of different types according to preset conversion methods, respectively, during the first type of conversion and transmits the plurality of converted images of different types to the fine dust measurement device, and the fine dust measurement device is configured to input the plurality of converted images into the deep learning model, respectively, to train the deep learning model so that prediction values of fine dust concentration for the plurality of converted images are output, respectively, and a difference between each of the prediction values of fine dust concentration and a correct answer value is minimized.

4. The fine dust measurement system of claim 3, wherein the fine dust measurement device is configured to extract a prediction value which is closest to the correct answer value among the prediction values of fine dust concentration, store a type of converted image corresponding to the extracted prediction value by matching the type with one or more of environmental information and climate information during photographing, and share the matched and stored information with the video photographing device.

5. The fine dust measurement system of claim 4, wherein the video photographing device is configured to acquire one or more of the environmental information and climate information during photographing of the target place, determine what type of image to convert, all or a portion of the photographed image based on one or more of the acquired environmental information and climate information, generate a converted image by converting all or a portion of the photographed image into an image of the determined type, and transmit the converted image to the fine dust measurement device.

6. The fine dust measurement system of claim 5, wherein the fine dust measurement device is configured to output the fine dust concentration of the target place by inputting the converted image into a previously trained deep learning model.

7. A fine dust measurement method performed on a computing device including one or more processors and a memory that stores one or more programs executed by the one or more processors, the method comprising: photographing a target place; generating a converted image or converted data by converting all or a portion of a photographed image; and transmitting the converted image or the converted data to a fine dust measurement device equipped with a deep learning model, wherein the fine dust measurement device trains a deep learning model to output a fine dust concentration of the target place by inputting the converted image or converted data into the deep learning model, wherein, in the generating, a converted image is generated by performing a first type of conversion for converting all or a portion of the photographed image into an image with different characteristics, or converted data is generated by performing a second type of conversion for converting all or a portion of the photographed image into data in another form, wherein the generating includes determining to perform the first type of conversion when a degree of network communication with the fine dust measurement device is equal to or greater than a preset first reference level and determining to perform the second type of conversion when the degree of network communication is less than a second reference level set to be lower than the first reference level.

8. The fine dust measurement method of claim 7, further comprising:

acquiring one or more of the environmental information and climate information during photographing of the target place; and determining what type of image to convert all or a portion of the photographed image based on one or more of the acquired environmental information and climate information during the first type of conversion.

<div align="center">* * * * *</div>